United States Patent [19]

Tracht et al.

[11] Patent Number: 5,686,662

[45] Date of Patent: Nov. 11, 1997

[54] BRAKE CONTROL SYSTEM

[75] Inventors: Steven Lee Tracht, Brighton; Howard Hans Ludwig, Eastpoint; Douglass L. Carson, Walled Lake, all of Mich.

[73] Assignee: General Motors Corporation, Detroit, Mich.

[21] Appl. No.: 733,055

[22] Filed: Oct. 16, 1996

[51] Int. Cl.$^6$ .......................... G01P 13/04; G01M 15/00
[52] U.S. Cl. .................. 73/121; 73/117.3; 73/118.1; 73/129; 364/426.016; 364/426.01; 340/935; 303/140
[58] Field of Search .................. 73/116, 117.2, 73/117.3, 118.1, 121, 122, 126, 129; 340/453, 935, 444, 465; 364/426.01, 426.016, 426.025; 303/140

[56] References Cited

U.S. PATENT DOCUMENTS

| | | | |
|---|---|---|---|
| 4,794,539 | 12/1988 | Wallentowitz et al. | 303/140 |
| 4,998,593 | 3/1991 | Karnopp et al. | 364/426.016 |
| 5,001,636 | 3/1991 | Shiraishi et al. | 364/424.05 |
| 5,172,961 | 12/1992 | Inoue et al. | 303/100 |
| 5,204,815 | 4/1993 | Yamamoto et al. | 364/424.05 |
| 5,228,757 | 7/1993 | Ito et al. | 364/426.01 |
| 5,275,475 | 1/1994 | Hartmann et al. | 364/426.016 |
| 5,311,431 | 5/1994 | Cao et al. | 364/426.016 |
| 5,332,300 | 7/1994 | Hartmann et al. | 364/426.025 |
| 5,333,058 | 7/1994 | Shiraishi et al. | 364/426.016 |
| 5,341,297 | 8/1994 | Zomotor et al. | 364/426.016 |
| 5,444,621 | 8/1995 | Matsunaga et al. | 364/424.05 |

FOREIGN PATENT DOCUMENTS

| | | |
|---|---|---|
| 0 555 860 A1 | 8/1993 | European Pat. Off. |
| 41 23 235 C1 | 11/1992 | Germany. |
| 41 21 954 A1 | 1/1993 | Germany. |
| 42 00 061 A1 | 7/1993 | Germany. |
| 42 23 385 A1 | 1/1994 | Germany. |
| 42 29 504 A1 | 3/1994 | Germany. |
| 43 11 077 A1 | 10/1994 | Germany. |
| 43 14 827 A1 | 11/1994 | Germany. |
| 405262213 A | 10/1993 | Japan. |
| 406024304 A | 2/1994 | Japan. |
| 406087421 A | 3/1994 | Japan. |
| 406115418 A | 4/1994 | Japan. |
| 406127354 A | 5/1994 | Japan. |
| 2 257 551 | 1/1993 | United Kingdom. |
| 2 263 340 | 7/1993 | United Kingdom. |
| 2269571 | 2/1994 | United Kingdom. |
| 2 275 312 | 8/1994 | United Kingdom. |

OTHER PUBLICATIONS

May the Cornering Force Be With You; Popular Mechanics; Dec. 1995, pp. 74–77.

Stable as She Goes: Don Sherman, Automotive Industries, May 1995.

The Spin Doctors: Don Sherman, 12PS95, date unknown.

Mercedes/Bosch ESP; Automotive Industries, Apr. 1995.

Controlling Vehicle Stability; Christopher A. Sawyer, Automotive Industries, Jan. 1995.

Let Magic Fingers Do the Driving: Wards Auto World; May 1995.

Technoid: Intelligent Brakes are on the Way; Car and Driver, Aug. 1994.

(List continued on next page.)

*Primary Examiner*—George M. Dombroske
*Attorney, Agent, or Firm*—Anthony Luke Simon

[57] ABSTRACT

A vehicle yaw rate control method comprising the steps of: first estimating vehicle yaw rate responsive to a first set of criteria; second estimating vehicle yaw rate responsive to a second set of criteria, wherein the first set of criteria includes a first vehicle condition not included in the second set of criteria and wherein the second set of criteria includes a second vehicle condition not included in the first set of criteria; measuring vehicle yaw rate using a yaw rate sensor; and indicating a reverse travel condition if both of the first and second estimates have signs opposite to a sign of the measured vehicle yaw rate.

6 Claims, 3 Drawing Sheets

OTHER PUBLICATIONS

Toyota Vehicle Stability Control System; Automotive Engineering, Aug. 1995.

Vehicle Dynamics Offers New Level of Safety: Machine Design, Sep. 1994.

Handling Control Systems for Your Car: Popular Electronics; Feb. 1995.

VDC, The Vehicle Dynamics Control System of Bosch: A. VanZanten, R. Erhardt and G. Pfaff; Robert Bosch GmbH; No. 950759, pp. 9–26, date unknown.

BRAKE CONTROL SYSTEM

This invention relates to a brake control system and method.

BACKGROUND OF THE INVENTION

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide brake-by-wire control.

SUMMARY OF THE PRESENT INVENTION

It is an object of this invention to provide a brake control method according to claim 1.

Advantageously this invention provides a control for use in systems that actively control the brakes of a motor vehicle. Advantageously this invention provides a control for use in systems that provide yaw rate control to minimize a difference between an actual vehicle yaw rate and a desired vehicle yaw rate.

Advantageously, this invention provides a control that determines and signals when a vehicle is traveling in reverse, allowing the active brake control or other yaw rate control to take into account the reverse travel condition when determining control commands.

Advantageously, this invention determines a reverse travel condition independently of the vehicle operator's positioning of the gear shift control. Advantageously, this invention allows detection of a reverse travel condition that results from a maneuver that started with the vehicle traveling forward.

Advantageously, this invention determines a reverse travel condition of the vehicle using two independent tests, thereby verifying the detection of the reverse travel condition before signaling such condition to the controller.

Advantageously, according to a preferred example, this invention provides a vehicle yaw rate control method comprising the steps of: first estimating vehicle yaw rate responsive to a first set of criteria; second estimating vehicle yaw rate responsive to a second set of criteria, wherein the first set of criteria includes a first vehicle condition not included in the second set of criteria and wherein the second set of criteria includes a second vehicle condition not included in the first set of criteria; measuring vehicle yaw rate using a yaw rate sensor; and indicating a reverse travel condition if both of the first and second estimates have signs opposite to a sign of the measured vehicle yaw rate.

Advantageously, according to a preferred example, this invention provides a vehicle yaw rate control system comprising: a yaw rate sensor for measuring actual vehicle yaw rate; a plurality of sensors for sensing a plurality of vehicle conditions; and an electronic controller comprising: (a) a first yaw rate estimator responsive to a first set of the plurality of sensors and providing a first estimated yaw rate output, (b) a second yaw rate estimator responsive to a second set of the plurality of sensors and providing a second estimated yaw rate output, wherein the first set includes at least a first sensor not included in the second set and wherein the second set includes at least a second sensor not included in the first set, and (c) a comparator coupled to the first and second yaw rate estimators and to the yaw rate sensor and providing an output indicating a reverse travel condition if both of the first and second estimated yaw rate outputs have signs opposite to a sign the measured vehicle yaw rate.

BRIEF DESCRIPTION OF THE DRAWINGS

The present invention will now be described by way of example with reference to the following drawings, in which.

DETAILED DESCRIPTION OF THE INVENTION

Figure 1:
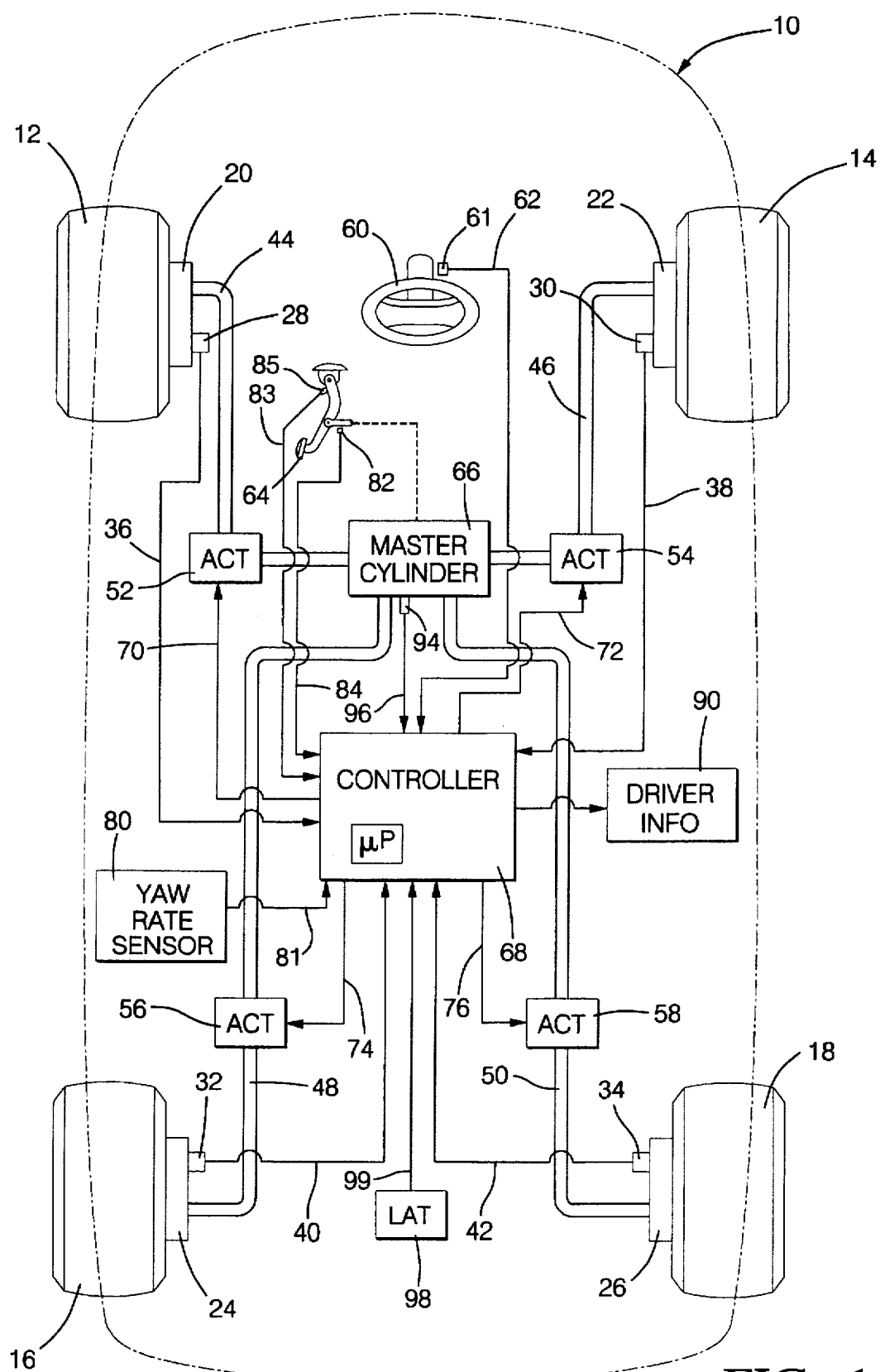
FIG. 1 is an example schematic of a vehicle brake control system according to this invention.

Referring to FIG. 1, the vehicle 10 shown includes a controllable brake system with controller 68 for controlling the brakes 20, 22, 24 and 26 for wheels 12, 14, 16 and 18, respectively. Various inputs to the controller 68 include the wheel speed signals on lines 36, 38, 40 and 42 from wheel speed sensors 28, 30, 32 and 34, the brake pedal switch signal on line 84 from brake pedal switch 82, the brake pedal extended travel signal on line 83 from pedal travel sensor 85 (optional), the steering wheel angle signal on line 62 from sensor 61 indicating the angle of steering wheel 60, the yaw rate signal on line 81 from yaw rate sensor 80, the master cylinder pressure signal on line 96 from master cylinder pressure sensor 94 (optional) and the lateral acceleration signal on line 99 from lateral accelerometer 98.

Each of the sensors 28, 30, 32, 34, 61, 80, 82, 85 and 98 is implemented in a manner known to those skilled in the art. The brake pedal travel sensor 85 is a switch mounted to the pedal that provides an output signal when the pedal has been depressed an extended amount indicating "hard" braking by the driver.

In one example, the steering wheel position sensor 61 may be a digital sensor that provides output signals that increment a digital position signal within controller 68 with each degree or partial degree of movement of the steering wheel 60 in one direction and decrement the digital position signal with each degree or partial degree of movement in the opposite direction. The steering wheel sensor 61 may also include an analog sensor position output (i.e., from a rotary resistive device of a known type) that provides approximate steering wheel position information. The analog output can be used, for example, to determine whether the steering wheel is turned less than a preset limit, i.e., 90 degrees, at vehicle start-up. A method for determining the center position of the steering wheel position sensor is disclosed in pending U.S. patent application, Ser. No. 08/664,321, assigned to the assignee of this invention.

Responsive to the various inputs, the controller controls the braking of each wheel in anti-lock braking mode during certain braking maneuvers and in traction control mode during certain vehicle positive acceleration maneuvers to maintain tractive force of the drive wheels on the road surface. The anti-lock brake control and positive acceleration traction control are performed in a known manner except as modified herein.

The controller 68 also actively controls the wheel brakes 20, 22, 24 and 26 responsive to the actual vehicle yaw rate as measured by yaw rate sensor 80 to minimize the difference between the actual vehicle yaw rate and a desired vehicle yaw rate. Because the base braking, antilock braking and traction control functions are known to those skilled in the art, only a general description thereof will be set forth herein.

When the vehicle is in a braking maneuver, the controller monitors the wheel speed signals from sensors 28, 30, 32 and 34 and determines if one or more of the wheels is in or is about to be in an incipient lock-up condition, in which case anti-lock brake control mode for the one or more wheels is activated. In the anti-lock brake control mode, the controller 68 determines and outputs commands to the actuators 52, 54, 56 and 58 corresponding to the wheels in anti-lock brake mode to modulate brake force to the wheels. Through control of the actuators 52, 54, 56 and 58, the controller prevents the wheels from entering a lock-up condition while achieving effective brake control and steeribility in a manner known to those skilled in the art of anti-lock brake control.

When the vehicle is not in a braking maneuver, but is accelerating due to output motive force from the vehicle prime mover, i.e., the internal combustion engine or electric motor, the controller 68 monitors the wheel speeds sensed by sensors 28, 30, 32 and 34 to determine if the wheels transferring motive force to the road surface are slipping or are about to slip. In such wheel conditions, the controller 68 sends commands to the actuators 52–58 corresponding to the wheels that are slipping or are about to slip to provide brake force to the wheels to reduce the slip. Such control is typically performed in conjunction with a parallel control in the engine or motor controller to temporarily reduce the motive force output until wheel to road traction is reestablished.

In one example, the brake actuators 52–58 are implemented as reciprocating piston actuators of a type known to those skilled in the art. Such actuators typically include a dc motor positionally controlling a reciprocating piston through a rotary-to-linear motion converter to increase and/or decrease hydraulic pressure in the wheel brakes. In another example, brake actuators 52–58 are implemented as solenoid valves for selectively coupling brakes 20–26 to a source of pressurized hydraulic fluid to increase brake pressure and for selectively coupling brakes 20–26 to a brake fluid reservoir to decrease brake pressure. Implementation of such solenoid valves is known to those skilled in the art. In yet another example, the rear brakes and/or the front brakes may be electric motor-driven brakes, in which case the actuator and brake functions are performed by the same unit. An example of a brake system including front hydraulic brakes and rear electric brakes in which all four brakes are drive-by-wire is set forth in U.S. Pat. No. 5,366,291, assigned to the assignee of this invention.

In general, the active brake control of the four wheel brakes 20–26 is performed responsive to the steering wheel angle signal on line 62, the yaw rate signal on line 81, the vehicle speed as calculated responsive to the signals from the four wheel speed sensors and the lateral acceleration signal on line 99. Using these signals, controller 68 determines a desired vehicle yaw rate and compares that desired yaw rate to the actual yaw rate sensed by sensor 80. If the actual yaw rate of the vehicle differs from the desired yaw rate by more than a threshold that is dynamically determined, controller 68 determines and outputs commands to actuators 52, 54, 56 and 58 to control the vehicle wheel brakes 20, 22, 24 and 26 to bring the vehicle yaw rate into conformance with the desired yaw rate.

In carrying out these tasks, controller 68 typically includes a microprocessor, ROM and RAM and appropriate input and output circuits of a known type for receiving the various input signals and for outputting the various control commands to the actuators 52, 54, 56 and 58.

Figure 2:
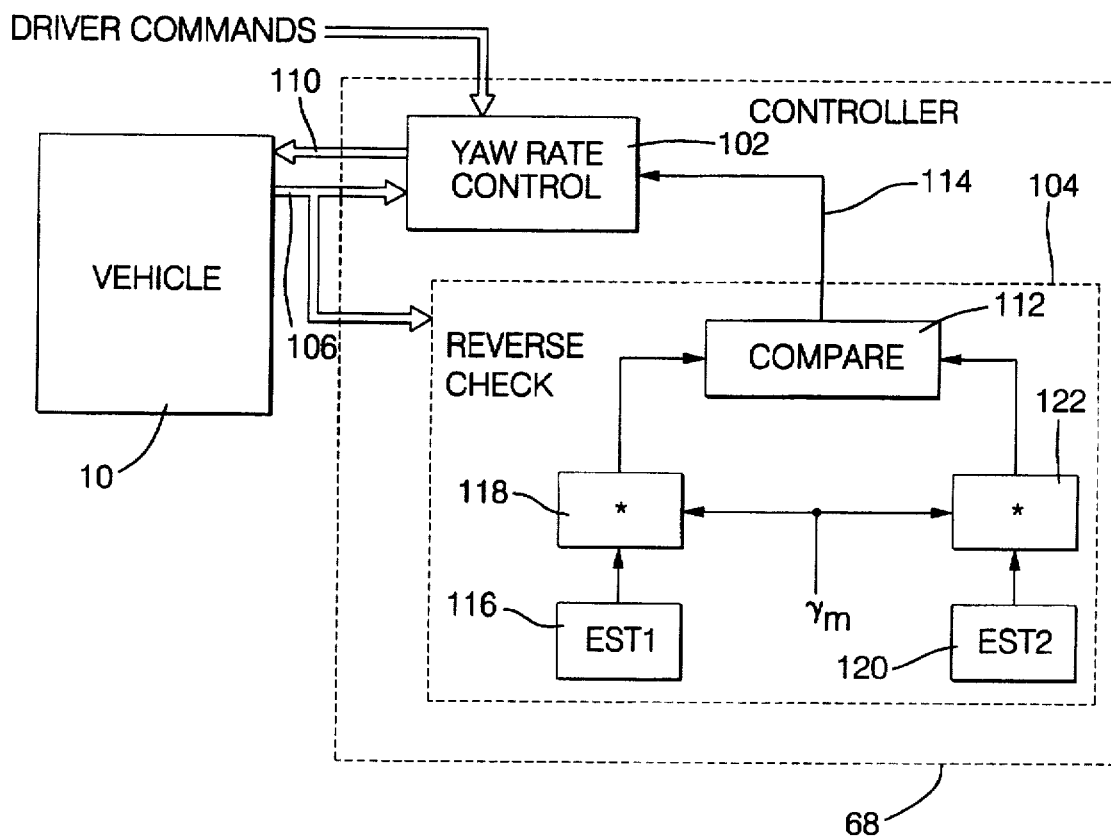
FIG. 2 illustrates an example control structure according to this invention.

Referring now to FIG. 2, a schematic of an example control structure according to this invention is shown. The vehicle 10 provides information shown by arrow 106 to the yaw rate control 102 and reverse check control 104, both implemented in the controller 68. The information provided by line 106 includes the signals from the various sensors illustrated in FIG. 1 communicating the various vehicle conditions to the yaw rate control 102 and reverse check control 104.

The yaw rate control 102 processes the various information received from the vehicle 10 and compares the measured yaw rate as sensed by yaw rate sensor 80 to the desired vehicle yaw rate as determined in response to operator input affected conditions such as vehicle steering wheel angle and vehicle speed. If a difference between the measured vehicle yaw rate and the desired vehicle yaw rate is over a threshold, the yaw rate control 102 provides commands through line 110 to the vehicle 10 selectively commanding the vehicle brakes to adjust the actual yaw rate of the vehicle, bringing the actual yaw rate into conformance with the desired yaw rate. Because the yaw rate control is not central to this invention, further detail thereof will not be set forth herein. Those skilled in the art will realize that various yaw rate control systems are known to those skilled in the art and any such known yaw rate control system, modified as described herein, may be used with this invention. An example yaw rate control is set forth in copending United States patent application, Attorney Docket No. H-198195 assigned to the assignee of this invention, the disclosure of which is incorporated herein by reference.

The reverse check control 104 uses two estimators 116 and 120 to estimate vehicle yaw rate using information from the vehicle sensors. The estimator 116 uses a first set of criteria and the estimator 120 uses a second set of criteria, so that the two estimators 116, 120 yield independently determined yaw rate estimations. Blocks 118 and 122 multiply the output of the estimators 116, 120 by the measured yaw rate as a manner of comparing the signs of the estimations to the sign of the measured yaw rate. Results from blocks 118 and 122 that are less than zero indicate yaw rate estimations having different signs than the measured yaw rate. Block 112 compares the outputs of blocks 118 and 122 and, if both are negative, then the reverse travel flag is set on line 114 and provided to the yaw rate control block 102.

Figure 3:
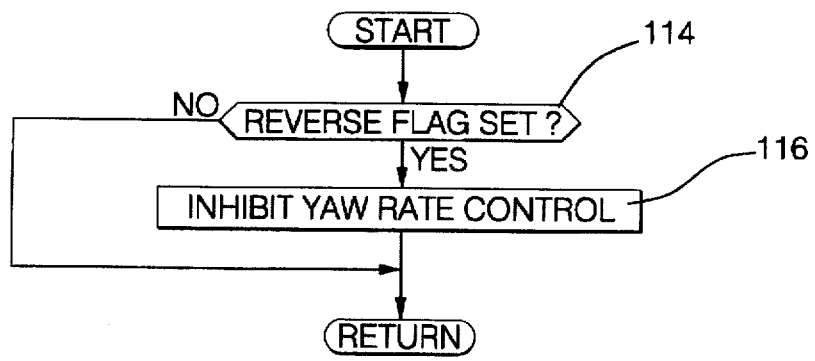
FIGS. 3 and 4 illustrate example control routines according to this invention.

Referring now to FIG. 3, the subroutine shown is performed by the yaw rate control 102 (FIG. 2) with each loop of the control routine. Block 114 checks a reverse flag that is controlled as described below with reference to FIG. 4 and, if the flag is set to true, which indicates that the vehicle is traveling in reverse, the routine continues to block 116. Block 116 interacts with the known yaw rate control system preferably by prohibiting entrance into the yaw rate control mode when the reverse flag is set to true. This allows the control to detect a reverse travel condition independent of the output of the gear shift, thus allowing the reverse travel condition to be indicated (i) when the switch on the gear shift that would normally indicate a reverse travel condition is not functioning properly and (ii) when the vehicle is traveling in reverse while the gear shift is not positioned to select reverse (i.e., such as rolling backwards on a hill when the gear shift is in drive). If, at block 114, the reverse flag is not set, then the subroutine shown in FIG. 3 is exited.

Figure 4:
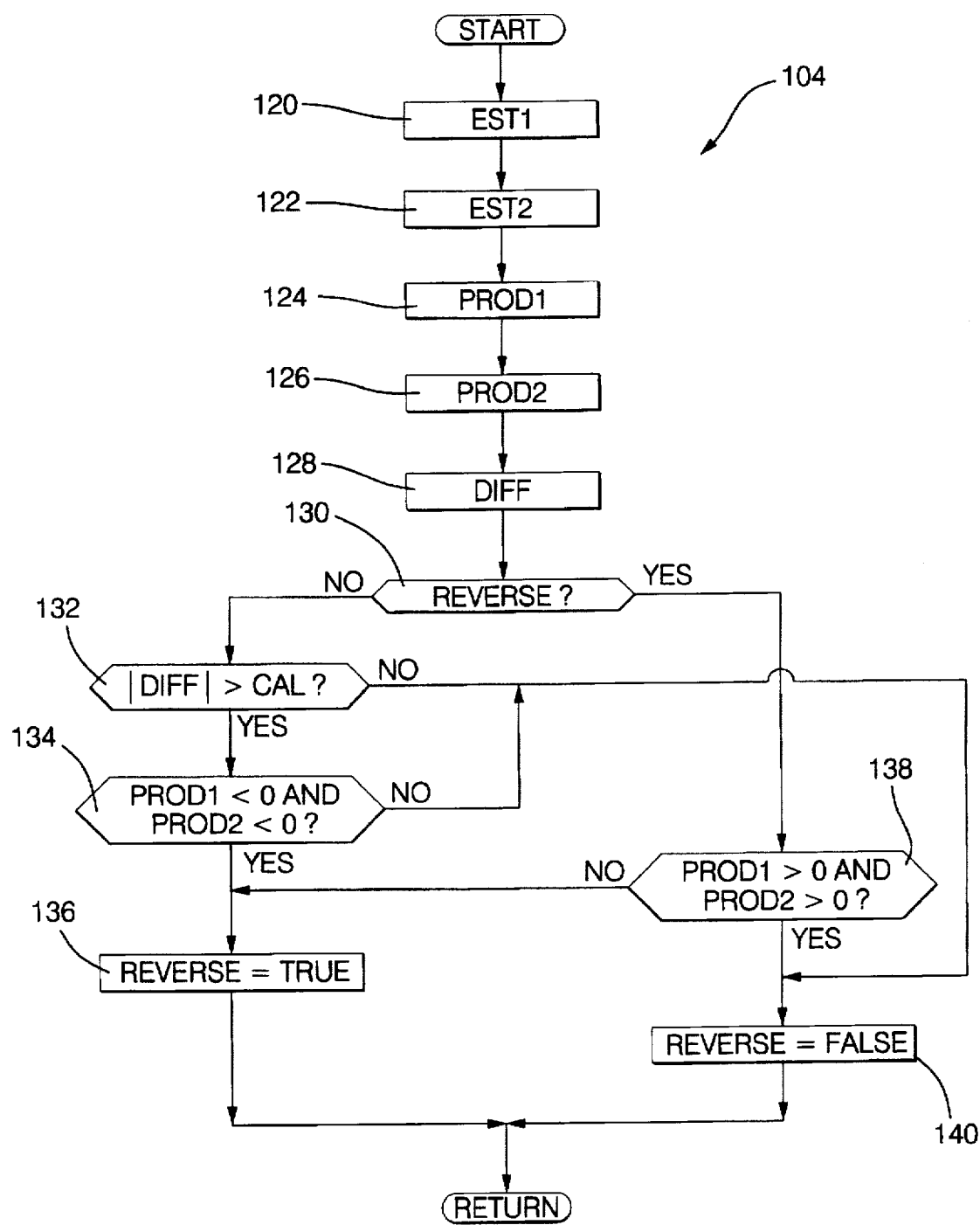

Referring now to FIG. 4, the example reverse check control routine starts at block 120 where it determines a first estimate of vehicle yaw rate, EST1, according to the equation:

$$EST1=(V_{LR}-\omega_c * V_{RR})/D,$$

where $V_{LR}$ is the left undriven wheel speed, $V_{RR}$ is the right undriven wheel speed, D is the track width of the vehicle (i.e., the distance between the left and right rear wheels of the vehicle), and $\omega_C$ is a correction coefficient, which, for example, is determined according to:

$$\omega_C = (V_{LR} - \gamma_M * D)/V_{RR},$$

where $\gamma_M$ is the measured yaw rate. The value $\omega_C$ is determined, for example, once after each start-up of the vehicle and is then frozen for the remaining running time of the vehicle. Thus at block 120, the first yaw rate estimate, EST1, is determined responsive to the speeds of the left and right undriven wheels of the vehicle.

Next, block 122 determines a second yaw rate estimate, EST2, according to the equation:

$$EST2 = (V_S/L) * (\delta/K_{GR} - A_M * K_U),$$

where $V_S$ is the vehicle speed, L is the vehicle wheel base, $\delta$ is the steering wheel angle, $K_{GR}$ is the steering gear ration, $A_M$ is the vehicle measured lateral acceleration and $K_U$ is the vehicle understeer coefficient. Thus, the second yaw rate estimate, EST2, is determined in response to vehicle speed, steering wheel position and lateral acceleration.

Through blocks 120 and 122, EST1 and EST2 are determined independently of one another, each relying on a distinct set of vehicle conditions to arrive at the yaw rate estimate. The use of independent estimates prevents a triggering of false reverse indication because, while certain vehicle conditions may falsely result in one of the estimates, EST1 or EST2, indicating that the vehicle is traveling in reverse, that same set of conditions is unlikely to falsely result in the other of the estimates, EST1 or EST2, indicating that the vehicle is traveling in reverse.

From block 122, the routine continues to block 124 where a first product, PROD1, is determined according to:

$$PROD1 = \gamma_M * EST1,$$

where $\gamma_M$ is the actual vehicle yaw rate measured by the yaw rate sensor 80 (FIG. 1). Next block 126 determines a second product, PROD2, according to:

$$PROD2 = \gamma_M * EST2.$$

From block 126, the routine moves to block 128 where it determines an error value, ERROR, according to:

$$ERROR = EST2 - \gamma_M.$$

Next block 130 checks the reverse flag and, if the reverse flag is set to true, the routine continues to block 138 where it checks whether PROD1 and PROD2 are both greater than zero. If both PROD1 and PROD2 are greater than zero, then block 140 sets the reverse flag to false, indicating that the vehicle is not traveling in reverse. From block 140, the control routine is ended. If, at block 138, at least one of PROD1 and PROD2 is not greater than zero, then the routine moves to block 136 where the reverse flag is set true. After block 136 the routine exits.

If, at block 130, the reverse flag is not set to true, the routine continues to block 132 where it compares the absolute value of ERROR to a predetermined threshold. The predetermined threshold is set equal to the amount of error normally expected between EST2 and $\gamma_M$ and can be determined in a test vehicle by monitoring both EST2 and $\gamma_M$ and setting the predetermined threshold as the typical maximum difference between the two values. If the absolute value of ERROR is not greater than the predetermined threshold, then the routine continues to block 140 where it sets the reverse flag to false. The test at block 132 prevents the false detection of reverse travel when PROD2 is negative due only to the expected error in the estimation EST2.

If, at block 132, ERROR is greater than the calibration value, then at block 134 the routine compares PROD1 and PROD2 to zero. If both are less than zero, block 136 sets the reverse flag to true indicating that the vehicle is traveling in reverse. Otherwise, the routine continues to block 140 where the reverse flag is to false. From block 136 or 140, the routine is ended.

Thus the reverse check 104 as exemplified by FIG. 4 uses two independent estimates of yaw rate and the actual measured value of yaw rate to determine whether or not the vehicle is traveling in reverse. This method provides advantages in that conditions that may trigger a false reverse according to one estimation strategy will not trigger a false reverse in the other estimation strategy and are thereby prevented from affecting the result and falsely triggering a reverse condition of the vehicle.

The robust reverse check provided allows the yaw rate control 102 (FIG. 2) to receive an indication of when the vehicle is traveling in reverse and to prevent activation of the yaw rate control or otherwise appropriately modify the yaw rate control under such conditions.

We claim:

1. A vehicle yaw rate control method comprising the steps of:

first estimating vehicle yaw rate responsive to a first set of criteria;

second estimating vehicle yaw rate responsive to a second set of criteria, wherein the first set of criteria includes a first vehicle condition not included in the second set of criteria and wherein the second set of criteria includes a second vehicle condition not included in the first set of criteria;

measuring vehicle yaw rate using a yaw rate sensor; and indicating a reverse travel condition if both of the first and second estimates have signs opposite to a sign of the measured vehicle yaw rate.

2. A vehicle yaw rate control method according to claim 1, also comprising the step of:

determining a difference between the second estimate and the measured yaw rate, wherein the reverse travel condition is indicated only when a magnitude of the difference is greater than a predetermined threshold.

3. A vehicle yaw rate control method according to claim 1, also comprising the step of inhibiting yaw rate control when a reverse travel condition is indicated.

4. A vehicle yaw rate control method according to claim 1, also comprising the step of removing the indication of the reverse travel condition if both of the first and second estimates have signs that are the same as the sign of the measured vehicle yaw rate.

5. A vehicle yaw rate control method according to claim 1, wherein the first set of criteria includes left and right undriven wheel speeds and the second set of criteria includes steering wheel angle and vehicle lateral acceleration.

6. A vehicle yaw rate control system comprising:

a yaw rate sensor for measuring actual vehicle yaw rate;

a plurality of sensors for sensing a plurality of vehicle conditions; and an electronic controller comprising:
- (a) a first yaw rate estimator responsive to a first set of the plurality of sensors and providing a first estimated yaw rate output,
- (b) a second yaw rate estimator responsive to a second set of the plurality of sensors and providing a second estimated yaw rate output, wherein the first set includes at least a first sensor not included in the second set and wherein the second set includes at least a second sensor not included in the first set, and
- (c) a comparator coupled to the first and second yaw rate estimators and to the yaw rate sensor and providing an output indicating a reverse travel condition if both of the first and second estimated yaw rate outputs have signs opposite to a sign of the measured vehicle yaw rate.

* * * * *